(12) United States Patent
Zhu et al.

(10) Patent No.: US 7,457,361 B2
(45) Date of Patent: Nov. 25, 2008

(54) BLOCK MOTION ESTIMATION METHOD

(75) Inventors: Ce Zhu, Singapore (SG); Xiao Lin, Singapore (SG); Lap Pui Chau, Singapore (SG)

(73) Assignee: Nanyang Technology University, Singapore (SG)

( * ) Notice: Subject to any disclaimer, the term of this patent is extended or adjusted under 35 U.S.C. 154(b) by 861 days.

(21) Appl. No.: 10/478,801

(22) PCT Filed: Jun. 1, 2001

(86) PCT No.: PCT/SG01/00112

§ 371 (c)(1),
(2), (4) Date: Nov. 25, 2003

(87) PCT Pub. No.: WO02/098137

PCT Pub. Date: Dec. 5, 2002

(65) Prior Publication Data

US 2004/0190613 A1    Sep. 30, 2004

(51) Int. Cl.
*H04N 7/12* (2006.01)
*H04N 11/04* (2006.01)

(52) U.S. Cl. .............................. 375/240.16; 348/413.1; 348/416.1

(58) Field of Classification Search ............. 375/240.24
See application file for complete search history.

(56) References Cited

U.S. PATENT DOCUMENTS 6,363,117 B1 * 3/2002 Kok ....................... 375/240.24

7,072,398 B2 * 7/2006 Ma ........................ 375/240.16

OTHER PUBLICATIONS

Jong-Nam, Kim and Tae-Sun Choi; "A Fast Three-Step Search Algorithm With Minimum Checking Points Using Unimodal Error Surface Assumption"; Aug. 1998; IEEE Transactions on Consumer Electronics; vol. 44, No. 3 pp. 638-648.*
K. Ma and P. Hosur, "Performance Report of Motion Vector Field Adaptive Search Technique (MVFAST)," ISO/IEC JTC1/SC29/WG11 M5851, Mar. 2000.
S. Zhu and K. Ma, "A new diamond search algorithm for fast block-matching motion estimation," IEEE Transactions on Image Processing, vol. 9, No. 2, pp. 287-290, 2000.

(Continued)

*Primary Examiner*—Mehrdad Dastouri
*Assistant Examiner*—Jeremaiah C Huber
(74) *Attorney, Agent, or Firm*—Foley & Lardner LLP

(57) ABSTRACT

A block motion estimation method for estimating a motion vector on the basis of a position of a frame block in a current picture compared to a position of said frame block in a reference picture, by determining, at a plurality of search points of said current picture, a variation of the current picture as compared to the reference picture, said search points defining a polygonal search area along the perimeter thereof, said search area including some reference search points and inner search points, the method comprising the following steps: sub-dividing a plurality of n-tuples each n-tuple comprising n of said search points, wherein n is any integer from 1 (normally 2, 3 or more); determining a selected n-tuple of said subplurality of n-tuples having the smallest sum of distortions; and comparing the distortion at said central reference search point and at least one inner search point adjacent to the selected n-tuple such as to determine that search point thereof having the smallest distortion which is used in the estimation process

5 Claims, 2 Drawing Sheets

OTHER PUBLICATIONS

J. Tham, S. Ranganath, M. Ranganath and A. Kassim, "A novel unrestricted centre-biased diamond search algorithm for block motion estimation", IEEE Transaction on Circuits & Systems for Video Technology, vol. 8, No. 4, pp. 369-377, 1998.

R. Li, B. Zeng and M. L. Liou, "A new three step search algorithm for block motion estimation", IEEE Transactions on Circuits & Systems for Video Technology, vol. 4, pp. 438-442, 1994.

L. M. Po and W. C. Ma, "A novel four-step search algorithm for fast block motion estimation", IEEE Transactions on Circuits & Systems for Video Technology, vol. 6, pp. 313-317, 1996.

S.Zhu, et al, "A new diamond search algorithm for fast block matching motion estimation", Information, communications and signal processing, ICICS, pp. 292-296, Sep. 1997.

Hsien-His Hsieh et al, "A novel fast motion estimation algorithm using fixed subsampling pattern and multiple local winners search", IEEE Intl Symposium on Circuits and Systems, ISCAS 2001, vol. 2, pp. 241-244, 2001.

Tourapis A M et al, "An advanced zonal block based algorithm for motion estimation", Image Processing, Intl conference on Kobe, ICIP 99, pp. 610-614, Oct. 1999.

Nosratinia A et al, "Multi-resolution backward video coding", Proc. Of the Intl Conf. On Image Processing, ICIP, pp 563-566, Oct. 1995.

Yuen-Wen Lee et al, "Prediction and search techniques for RD-optimized motion estimation in a very low bit rate video coding framework", Acoustics, speech and signal processing, ICASSP 97, pp. 2861-2864, Apr. 1997.

Jae-Yong Kiam et al, "An efficient hybrid search algorithm for fast block matching in video coding", Proc. Of the IEEE region 10 conf. Cheju Island, TENCON 99, pp. 112-115, Sep. 1999.

* cited by examiner

BLOCK MOTION ESTIMATION METHOD

CROSS-REFERENCE TO RELATED APPLICATION

This application is the national stage application of the international application No. PCT/SG01/00112 filed on 01 Jun. 2001, and claims the benefit of the international application No. PCT/SG01/00112, the entire content of which is incorporated here by reference for all purposes.

BACKGROUND OF THE INVENTION

The invention relates to a block motion estimation method for estimating a motion vector on the basis of a position of a block in a current picture compared to a position of the found block in a reference picture.

In the field of encoding a video sequence (video encoding), the compression of video data has become a very important issue for reducing the amount of data needed to be transmitted and/or stored for the encoding of a plurality of pictures in a quality which is sufficiently high for a user.

A very important factor with respect to video data compression is the motion estimation between subsequent pictures of the video sequence, which is used to extract motion information from the video sequence. The extracted motion information is used for avoiding or at least reducing the temproral redundancy in subsequent video pictures.

Block-matching motion estimation is widely applied in many motion-compensated video coding techniques/standards such as ISO MPEG-1/2/4 and ITU-T H.261/262/263/263+/263L, which is aimed to exploit the strong temporal redundancy between successive frames. By partitioning a current frame into non-overlapping rectangular blocks/macroblocks of equal size, a block matching method attempts to find a block from a reference frame (past or future frame) that best matches a predefined block in the current frame. Matching is performed by minimizing a matching criterion, which in most cases is the mean absolute error between this pair of blocks. The block in the reference frame moves inside a search window centred around the position of the block in the current frame. The best matched block producing the minimum distortion is searched within the search window in the reference frame. The displacement of the current block with respect to the best matched reference block in x and y directions composes the motion vector assigned to this current block.

However, the motion estimation is quite computational intensive and can consume up to 80% of the computational power of the encoder if the full search is used by exhaustively evaluating all possible candidate blocks within a predefined search window. Therefore, fast algorithms are highly desired to significantly speed up the procedure without sacrificing the distortion sharply.

Many computationally efficient variants were developed, typically among which are the so-called three-step search, the new three-step search, the four-step search, the block-based gradient descent search and the diamond search algorithms, compare for instance references [1], [2], [3], [4], [5].

In the block-based motion estimation, the search pattern with different shapes or sizes has a great impact on the reachable search speed and the resulting distortion performance.

On one hand, in the three-step search, the new three-step search, the four-step search and the block-based gradient descent search algorithms, square-shaped search patterns of different sizes are employed. These topics are described in [4] and [5].

On the other hand, the diamond search algorithm, as described in [2] and [3], adopts a diamond-shaped search pattern, which has demonstrated faster processing time with marginally worse distortion in comparison with the three-step search, the new three-step search and the four-step search.

The search pattern used in the diamond search algorithm has a rectangular, diamond shape. Two different sizes of diamonds are employed. The larger one consists of nine search points (also denoted as checking points), of which eight search points surround a central search point. The small diamond search pattern consists of five inner search points, of which four inner search points surround a central search point to compose the diamond shape.

Recently, the inventors of the present invention have proposed a hexagon-based search algorithm (PCT/SG00/00176, unpublished). The basic idea of this concept can generally be seen in a hexagon-based search algorithm in the block motion estimation in a sequence of pictures, i.e. a video sequence, where the search algorithm can achieve significant speed improvement over the diamond search algorithm with similar distortion performance. The hexagon-based search algorithm employs two different sizes of hexagonal search patterns. The larger one consists of seven search points, of which six search points surround a central search point. The small hexagon search pattern comprises five inner search points, of which four inner search points surround a central search point.

However, there is still the emerging need to improve the processing speed for motion estimation.

SUMMARY OF THE INVENTION

It is an object of the present invention to provide a block motion estimation method which can be carried out with improved processing speed compared to the above-described search algorithms of the related art.

The object is achieved by providing a block motion estimation method which increases the speed of the motion estimating process by checking only a part instead of all inner search points within a polygonal search area without a significant loss of accuracy.

According to the block motion estimation method of the invention, a position of a frame block in a current picture as compared to a position of said frame block in a reference picture is estimated by determining, at a plurality of search points of said reference picture, a variation of the current picture as compared to the reference picture. Said search points define a polygonal search area along the perimeter of the search area. Said search area includes some reference search points checked and inner search points to be checked. The method comprises the following steps: The plurality of checked reference search points is sub-divided into a sub-plurality of n-tuples, each n-tuple comprising n of said reference search points, wherein n is any integer number from 1, and is normally 2, 3 or more. For each n-tuple of said sub-plurality of n-tuples, a distortion at each of said n reference search points of said each n-tuple is already known from the previous step and the determined distortions of said n search points is added so as to compute a sum of distortions of said each reference n-tuple. A selected n-tuple of said sub-plurality of n-tuples is determined having the smallest sum of distortions among said sub-plurality of n-tuples. At least one closest inner search point within said search area is identified to be checked, each said at least one closest inner search point having a distance from said selected n-tuple which is smaller than the distances of all the other further inner search points to be checked from said selected n-tuple. Furthermore, the distortion at said at least one closest inner search point is checked such as to determine that search point thereof having the smallest distortion.

It is mentioned that the comparison of the current minimum distortion and the distortion of at least one inner search point adjacent to the selected n-tuple is performed in order to determine that search point thereof having the smallest distortion. This search point with the smallest distortion is used in the estimation process, in other words the position of this search point provides one with the position to be estimated by the method. It is further noted that the search points forming the n-tuples are usually different search points than the above-mentioned inner search points.

The invention is based on the recognition that there exists a strong correlation between the tupel with the smallest sum of distortion and the adjacent inner search points.

The distortion can, for example, be determined based on the value of a physical parameter of a picture element in the reference picture and a picture element in the current picture, respectively. Such a physical parameter assigned to the picture elements may be a luminance information or a chrominance information, for instance. The calculation of the distortion can for example be performed by computing the mean absolute error between a physical parameter of a picture element in the reference picture and the physical parameter of a picture element in the current picture.

According to a preferred embodiment of the invention, the reference search points are the central search point in the search area and the search points along the perimeter of the search area. However, especially in cases of large polygons or polygons with a low degree of symmetry, the centered reference search point can alternatively be displaced from the central portion of the polygonal search area. Coming back to the case where the centered reference search point is the central search point, before carrying out the method of the invention, preferably a coarse search has already been performed resulting in an orientation of the search area with respect to the reference picture in which the central search point has a smaller distortion than all the other search points located on the perimeter of the search region.

According to a preferred embodiment of the invention, this coarse search is performed using an algorithm from the related art, for instance a three-step search method, a four-step search method, a diamond search method or a hexagonal search method.

The search can comprise a one-pixel search method or a half-pixel search method or a quarter-pixel search method. In other words: the method of the invention is carried out preferably when the search is switched from a coarse search, with the search area moving with respect to the picture, to a finer-resolution focused inner search within the search area. However, the combination of one of the coarse search methods with the block motion estimation method of the invention shall be considered to be a part of the invention.

Preferably, the reference picture is a preceding or a following picture of the current picture. However, usually the reference picture is a preceding picture.

The polygon defining the search area is a four-corner diamond according to a first preferred embodiment of the invention, while the polygon is a hexagon according to a second preferred embodiment of the invention. However, the shape of the search area is not restricted to these two geometrical forms. The shape of the polygon can alternatively be for instance a triangle, a rectangle, a pentagon, an octagon or the like.

According to a preferred embodiment of the invention, the search points of each n-tuple are adjacent search points in the search area. For example, three adjacent search points located on a face of a four-corner diamond can make up a 3-tuple, alternatively one search point located at one corner of the diamond and two search points located on two faces adjacent to the corner can make up a 3-tuple. A 2-tuple can be formed by two adjacent search points located on a face of a hexagon.

However, the search points of an n-tuple need not necessarily be adjacent search points. Especially in cases of large polygons, it can be reasonable to chose the search points of an n-tuple separated from each other by one or more further intermediate search points.

The number of search points is determined by the size of the polygonal search area. Normally, the larger the polygonal search area, the larger is the number of search points. The lower level of the size of the polygonal search area is determined by the distance of adjacent search points.

DETAILED DESCRIPTION OF THE INVENTION

Figure 1:
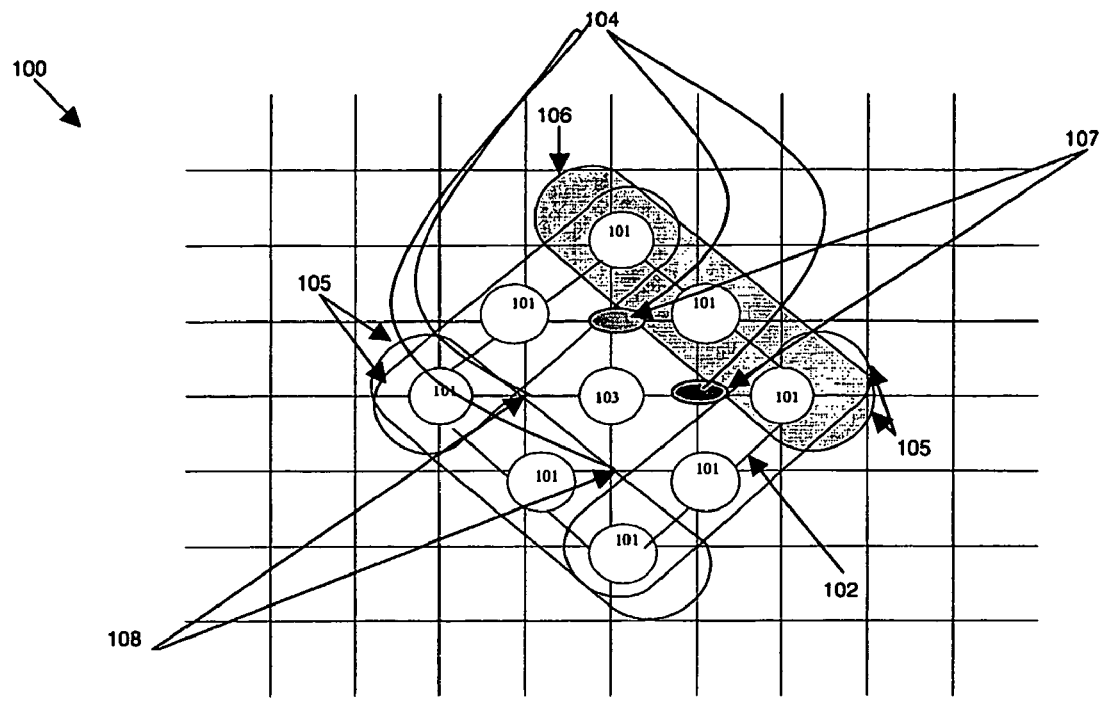
FIG. 1 shows a diagram illustrating a diamond search pattern according to a preferred embodiment of the invention.

Many fast block motion estimation algorithms employ gradient methods to find the optimal motion vector step by step. However, in these algorithms, only the smallest distortion is identified while the other distortion information is not exploited for the following next-step search. In fact, there is a strong correlation among the search points to be checked in the following step and their neighbouring search points checked in the current step. To take advantage of all the available information maximally, a new efficient search scheme is proposed by the invention to minimize the number of search points to be checked in the following search step. The distortion information of all the checked points helps determine the "focused" region to be checked, i.e., a more restricted search in a smaller region in the following search step results in the reduction of the number of search points. The scheme is particularly useful when the search is switched from coarse search to focused inner search. The invented scheme can be incorporated into any known fast algorithm such as three-step search, four-step search, diamond search and hexagonal search to further improve these algorithms significantly. Especially the half- or quarter-pixel search can be benefited greatly from the new scheme by evaluating only fewer than half of the search points that are required regularly.

Fast block motion estimation algorithms find motion vectors step by step. It is noted that for these fast algorithms only the point with smallest distortion is utilized while the other distortion information of the other checked points is not been exploited for the following search. In fact, there is a strong correlation among the search points to be checked in the following step and their neighbouring search points checked in the current step. In particular, when performing finer-resolution inner search, strong correlation exists among the inner search points to be checked in the shrunk pattern (such as diamond or square search pattern) and their surrounding search points checked in the large pattern. To fulfil more efficient search, the redundancy can be exploited for further speed improvement. In the scheme disclosed here, apart from finding the search point with the current minimum distortion, one also needs to consider the distortions of the other points, and one selects only those inner search points for further analysis that are most likely to yield a smaller distortion in the next step. In contrast to the fast algorithms of the related art, the search scheme of the invention maximally utilizes the distortion information of all checked points to minimize the number of search points. The distortion information of the currently checked points is fully exploited to make a more restricted search in the following step. Thus the number of search points can be reduced by only checking those that are most likely to be better matched search points. It is assumed that the global minimum has a monotonic distortion, and the nearer a search point is to the global minimum, the smaller is the distortion of this search point. Based on this reasonable assumption, one only needs to check the portion of the search points in the following step that are nearer to the checked points with relatively smaller distortions. For example, as a large search pattern is switched to its shrunk one in many fast methods such as the three-step search method and its variants, the four-step search method, the diamond search method and the hexagonal search method, the focused inner search can be performed by only evaluating a portion of new search points that are nearer to the evaluated search points with smaller distortions rather than by carrying out the complete inner search. This can save a lot of search points especially for the focused inner search or half- or quarter-pixel search. Based on the combination of this search points-saving scheme and the hexagonal search method, a hexagonal adaptive search technique is disclosed according to an preferred embodiment of the invention. The hexagonal adaptive search technique also exploits the motion vectors of neighbouring blocks to further speed up the search process.

The invention can generally be seen in an improved search scheme for carrying out a finer-resolution search for the position of a frame block in a reference picture compared to the position of the frame block in the current picture. This implies that before carrying out the method of the invention, usually (but not necessarily) a coarse search had already been carried out. As a result of this preceding coarse search, the search area is usually located in the reference picture in a way that the distortion at the central search point is smaller than the distortions at all search points along the perimeter of the search area. In other words, it is the main job of the block motion estimation method of the invention to find out the particular one of the inner search points which may have the smallest distortion among all search points. Concerning this finer-resolution search, the method of the invention usually analysed fewer inner search points than the finer-resolution search algorithms according to the related art. Thus, the motion estimation may be processed with improved speed compared to the motion estimation using the algorithms of the related art.

In summary, the block motion estimation method according to the invention may find any point in the motion field with fewer analysed search points than the algorithms of the related art.

The block motion estimation method will be described in detail with reference to preferred embodiments of the invention exemplified in the accompanying drawings.

Referring to FIG. 1, a preferred embodiment of the block motion estimation method of the invention is described for the case of a diamond search pattern.

According to this embodiment, the block motion estimation method for estimating a position of a frame block in a reference picture 100 as compared to a position of the frame block in the current picture is performed by determining, at a plurality of search points 101 of the current picture 100, a variation of the reference picture 100 as compared to the current picture, the search points 101 defining a four-corner diamond-shaped search area 102 along the perimeter thereof, the search area 102 including a central search point 103 and inner search points 104. The method comprises the following steps: sub-dividing the plurality of search points 101 into a sub-plurality of 3-tuples 105, each 3-tuple 105 comprising three of the search points 101; for each 3-tuple 105 of the sub-plurality of 3-tuples 105, determining a distortion at each of the three search points 101 of each 3-tuple 105 and adding the determined distortions of the three search points 101 so as to compute a sum of distortions of each 3-tuple 105; determining a selected 3-tuple 106 of the sub-plurality of 3-tuples 105 having the smallest sum of distortions among the sub-plurality of 3-tuples 105; identifying two closest inner search points 107 within the search area 102, the two closest inner search points 107 having a distance from the selected 3-tuple 105 which is smaller than the distances of two further inner search points 108 from the selected 3-tuple 106; comparing the distortion at the two closest inner search points 107 and the central search point 103 such as to determine that search point 107, 103 thereof having the smallest distortion.

According to the embodiment of the invention described with reference to FIG. 1, the reference search point 103 is a central search point in the search area 102, i.e. the reference search point 103 is basically located in the centre of the search area 102. The number of search points 101 making up a 3-tuple 105 is three according to the described embodiment (n=3) so that the 3-tuples 105 can be denoted as triples. The three search points 101 of each 3-tuple 105 are adjacent search points 101 in the search area 102. Strictly speaking, the search points 101 forming the 3-tuples 105 are located on the perimeter of the search area 102. As shown in FIG. 1, the polygon that equals to the search area 102 is a four-corner diamond having four faces, wherein each face makes up one 3-tuple 105, wherein each of the four 3-tuples 105 is formed by three search points 101 located on one of the faces of the four-corner diamond.

In a method step that is usually preceding the method steps of the block motion estimation method of the invention, the above-described diamond search method is carried out with the result that the distortion at the central search point 103 is smaller than the distortions at the eight search points 101 located on the perimeter of the diamond-shaped search area 102. This scenario is the starting point of the block motion estimation method of the invention. In other words: the complete diamond search algorithm of the related art usually employs two different sizes of diamonds, a larger one for a coarse search and a smaller one for a finer-resolution search (see description above). However, when combining the diamond search algorithm of the related art with the described embodiment of the block motion estimation method of the invention, only the coarse search with the larger diamond is carried out according to the related art, whereas the finer-resolution search with the smaller diamond is substituted by the block motion estimation method of the invention. This means that it is a goal of the block motion estimation method of the invention to estimate a particular one of the inner search points 104 and of the central search point 103 at which the distortion is minimal. The position of this particular search point 104, 103 equals to the position of the frame block in the reference picture 100 to be estimated.

In the following, it is described how to carry out the inner search in the case of the diamond-shaped search area 102 using the search scheme of the invention. The inner search within the small search area 102 determines the final motion vector. The search scheme of the invention leads to check only a portion of the inner search points 104, namely the two closest inner search points 107, that are near to the checked search points 101 of the selected 3-tuple 106 with the smallest sum of distortions. This can save around half or more search points for the focused inner search. It is assumed that the distortion at each of the search points 101, 103, 104 in the diamond-shaped search area 102 is known or at least determinable. In the following, the preferred embodiment of the efficient inner search scheme of the invention is described basing on exploiting the information of the eight distortions of the search points 101.

Since the diamond-shaped search area 102 has four faces, the consideration of three adjacent search points 101 along each face will produce two closest inner search points 107 to be checked (compare FIG. 1). By adding the distortion values of each triple 105 of three adjacent search points 101 along each face in the large diamond, one can determine the face corresponding to the smallest sum of the distortions which is denoted as selected 3-tuple 106. Then one simply needs to check the two closest inner search points 107 near to the selected 3-tuple 106 rather than all the four inner search points 104 (see FIG. 1). The distortions at the two closest inner search points 107 can be compared with the distortion of the central search point 103 to estimate the search point 103, 107 with the smallest distortion among all search points of the picture 100 (or at least of a selected portion of the picture 100).

Figure 2:
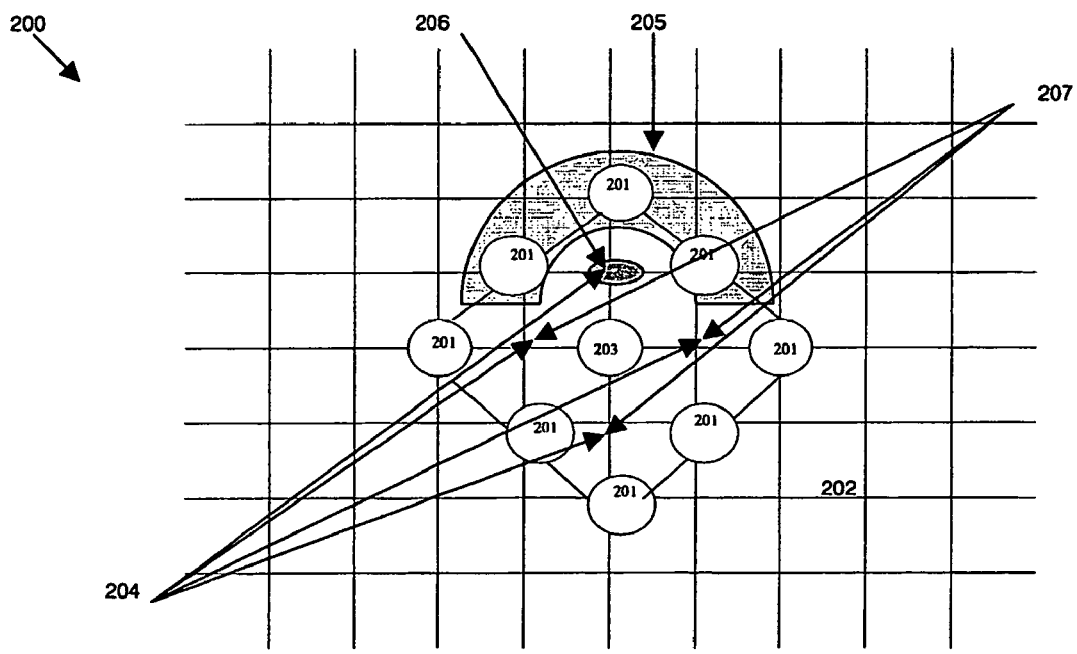
FIG. 2 shows a diagram illustrating a diamond search pattern according to another preferred embodiment of the invention.

Referring now to FIG. 2, the block motion estimation method according to another preferred embodiment of the invention is described using a diamond search pattern.

According to this other embodiment, the block motion estimation method for estimating a position of a frame block in a reference picture 200 as compared to a position of the frame block in the current picture is performed by determining, at a plurality of search points 201 of the current picture 200, a variation of the current picture 200 as compared to the reference picture, the search points 201 defining a four-corner diamond-shaped search area 202 along the perimeter of the search area 202, the search area 202 including a central search point 203 and inner search points 204. The method comprises the following steps: sub-dividing the plurality of search points 201 into a sub-plurality of 3-tuples (not shown in FIG. 2), each 3-tuple comprising three of the search points 201; for each 3-tuple of the sub-plurality of 3-tuples, determining a distortion at each of the three search points 201 of each 3-tuple and adding the determined distortions of the three search points 201 so as to compute a sum of distortions of each 3-tuple; determining a selected 3-tuple 205 of the sub-plurality of 3-tuples having the smallest sum of distortions among the sub-plurality of 3-tuples; identifying at least one closest inner search point 206 within the search area 202, the closest inner search point 206 having a distance from the selected 3-tuple 205 which is smaller than the distances of further inner search points 207 from the selected 3-tuple 205; comparing the distortion at the at least one closest inner search point 206 and the central search point 203 such as to determine that search point 206, 203 thereof having the smallest distortion.

The block motion estimation method according to the embodiment described with reference to FIG. 2 differs only in a few aspects from the embodiment described above referring to FIG. 1. Therefore, in the following, it will be pointed out to these differences, whereas the non-mentioned aspects are basically identical for both the described embodiments.

As shown in FIG. 2, the polygon that equals to the search area 202 is a four-corner diamond having four faces and four corners. Each face makes up one 3-tuple (not shown in FIG. 2) in the way described above with reference to FIG. 1, wherein each of the four 3-tuples is formed by three search points 201 located on one of the faces of the diamond. Beyond this, four further 3-tuples are formed by one search point 201 at one corner of the diamond and by two search points 201 located on two different faces adjacent to this corner. This means that altogether eight 3-tuples of search points 201 are formed according to the embodiment of the block motion estimation method of the invention described referring to FIG. 2. As one can gather from FIG. 2, the selected 3-tuple 205 is formed by one search point 201 at one corner of the diamond and by two search points 201 located on two faces adjacent to this corner.

Again, it is a main goal of the block motion estimation method of the invention to substitute and to improve the finer search within the smaller diamond, whereas the preceding coarse search with the larger diamond is carried out as in the related art.

According to the present embodiment, the edges or sides information concerning the distortion in the large diamond is exploited by adding the distortion values of any three adjacent search points 201 in the large diamond search pattern. Here, one totally has eight 3-tuples (triples) in the large diamond pattern. The triple that has the lowest total distortion is chosen as the selected 3-tuple 205 for the final inner search. The number of inner search points 204 to be analysed in the focused inner search is either one or two depending on the position of the triple 205 with the lowest total distortion. FIG. 2 illustrates the inner search in the frame for the case of the so-called Vertex Search. Vertex Search means that one of the four 3-tuples comprising search points 201 from two different faces of the diamond-shaped search area 202 has the smallest sum of distortions. In this Vertex Search, only one closest inner search point 206 will be checked which is located in between the centre search point 203 of the large diamond 202 and the selected 3-tuple 205 (compare FIG. 2). In contrast to this, in the frame of the so-called Face Search, the two inner search points nearest to the triple face with the smallest sum of distortions are checked. In short, the Face Search corresponds to the scenario described above referring to FIG. 1. According to the other embodiment of the block motion estimation method of the invention described here, the average number of inner search points 204 to be checked is beneficially further reduced compared to the number of inner search points 104 to be checked according to the first described embodiment.

Figure 3A:
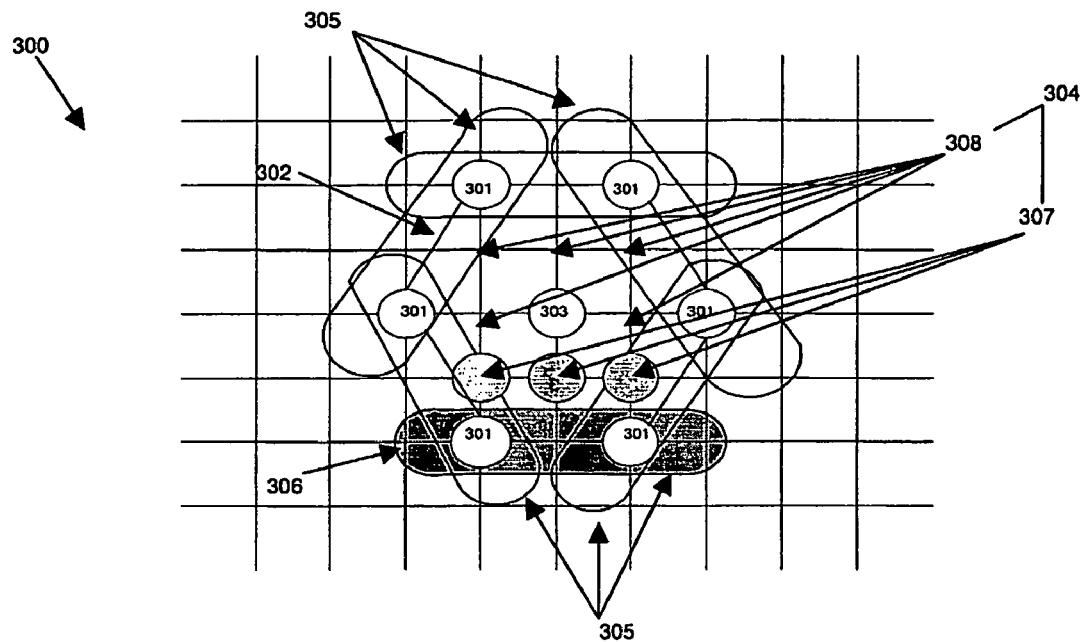
FIG. 3A shows a diagram illustrating a hexagonal search pattern according to a further preferred embodiment of the invention.
Figure 3B:
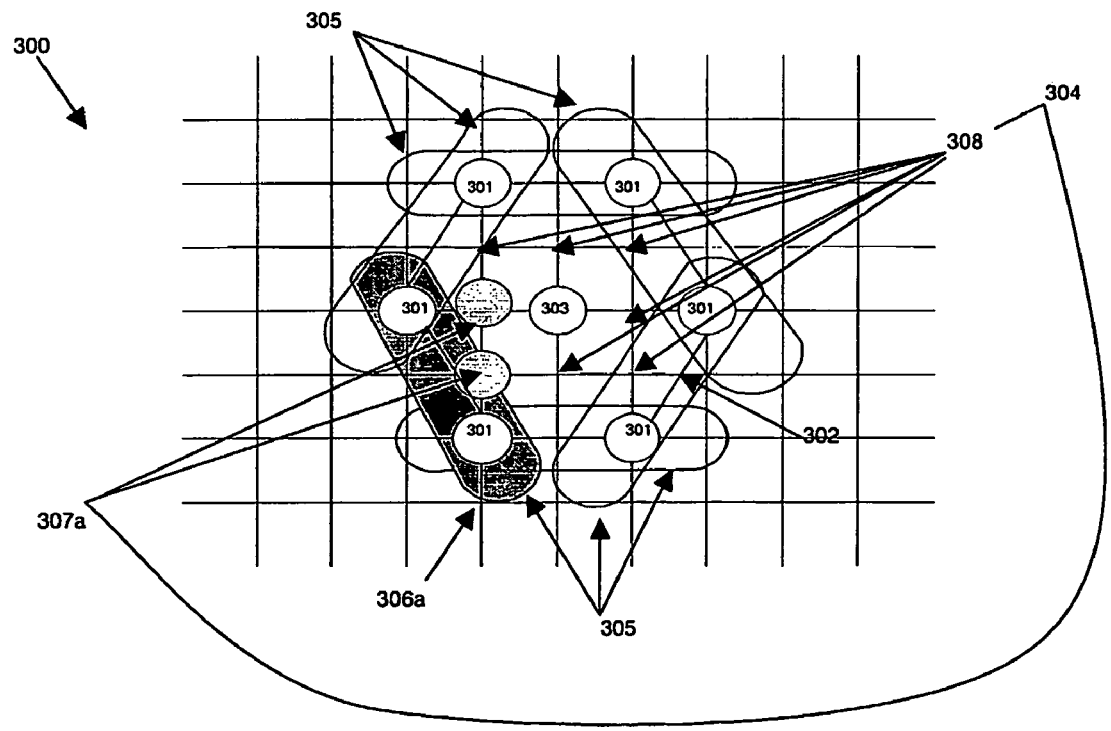
FIG. 3B shows a diagram illustrating a hexagonal search pattern according to the further preferred embodiment of the invention.

With reference to FIG. 3A and FIG. 3B, a further preferred embodiment of the block motion estimation method of the invention is described in detail.

According to this further embodiment, the block motion estimation method for estimating a position of a frame block in a reference picture 300 as compared to a position of the frame block in the current picture is performed by determining, at a plurality of search points 301 of the current picture 300, a variation of the current picture 300 as compared to the reference picture, the search points 301 defining a hexagonal search area 302 along the perimeter thereof, the search area 302 including a central search point 303 and inner search points 304. The method comprises the following steps: sub-dividing the plurality of search points 301 into a sub-plurality of 2-tuples 305, each 2-tuple 305 comprising two of the search points 301; for each 2-tuple 305 of the sub-plurality of 2-tuples 305, determining a distortion at both search points 301 of each 2-tuple 305 and adding the determined distortions of the two search points 301 so as to compute a sum of distortions of each 2-tuple 305; determining a selected 2-tuple 306 of the sub-plurality of 2-tuples 305 having the smallest sum of distortions among the sub-plurality of 2-tuples 305; identifying at least one closest inner search point 307 within the search area 302, the closest inner search point 307 having a distance from the selected 2-tuple 306 which is smaller than the distances of further inner search points 308 from the selected 2-tuple 306; comparing the distortion at the at least one closest inner search point 307 and the central search point 303 such as to determine that search point 307, 303 thereof having the smallest distortion.

It is emphasized that the comparison of distortions in the final method step with the distortion at the central (reference) search point 303 is in some sense optional, as the distortion at the central search point 303 has usually already been analysed in the usually preceding coarse search with the large diamond.

According to the embodiment of the method of the invention described with reference to FIG. 3A, the reference search point 303 is again a central search point in the search area 302, i.e. the reference search point 303 is basically located in the centre of the hexagon-shaped search area 302. The number of search points 301 making up a 2-tuple 305 is two according to the described embodiment (n=2). The two search points 301 of each 2-tuple 305 are adjacent search points 301 in the search area 302. Strictly speaking, the search points 301 forming the 2-tuples 305 are located on the perimeter of the search area 302. As shown in FIG. 3A, the polygon that equals to the search area 302 is a hexagon having six faces, each face forming one 2-tuple 305, wherein each of the six 2-tuples 305 formed by two search points 301 is located on one of the six faces of the hexagon. Altogether, six search points 301 are located on the six corners of the hexagon-shaped search area 302, and the central search point 303 is surrounded by the six search points 301 and is located basically in the centre of gravity of the hexagon.

In the following, an efficient method taking advantage of the knowledge of the distortion information of all the six checked search points 301 on the corners of the hexagon shown in FIG. 3A is described. According to the described edge-based inner search method, firstly the sum of distortions for each pair of two search points 301 in each face (i.e. for all the six 2-tuples 305) of the large hexagonal search pattern (i.e. of the search area 302) is calculated. Since the large hexagon has six faces, there are six sums of distortion values obtained from adding the distortion values of two search points 301 (also denoted as check points) along each of the six edges to be compared. The 2-tuple 305 of the large hexagonal search pattern that results in the smallest distortion sum value is used as the selected 2-tuple 306 for focused inner search. Only the closest inner search points 307 nearest to the selected 2-tuple 306 and being located within the hexagonal pattern need to be evaluated for the inner search. Referring to FIG. 3A, three closest inner search points 307 are used in the focused inner search, whereas the five further inner search points 308 need not be evaluated for the inner search. According to the scenario illustrated in FIG. 3A, three closest inner search points 307 have to be checked, as the smallest distortion sum occurs in one of the two horizontally oriented 2-tuples 305, namely the lower horizontal 2-tuple 305 of FIG. 3A is the selected 2-tuple 306. In contrast to this, only two closest inner search points 307a have to be checked, if the smallest distortion sum occurs in one of the four remaining slanting 2-tuples 305 of the hexagon 302. Such a situation is shown in FIG. 3B. Furthermore, one has to mention that the selected 2-tuple is a different one in FIG. 3B (the lower left slanted 2-tuple 305, reference sign 306a) than in FIG. 3A (the lower horizontal 2-tuple 305, reference sign 306).

Combining the inner search scheme, i.e. the block motion estimation method explained above, and the large hexagonal search pattern of the related art, a more efficient block motion estimation algorithm being part of the invention is obtained, which also exploits the motion information in the region of support comprising the neighbouring macroblocks. Two different search patterns are employed according to different motion activities. As the motion activity of the neighbour macroblocks is not very high or the neighbouring motion vectors can provide a good initial motion vector, the block motion estimation algorithm will adopt the small hexagon (diamond or cross) search pattern for the gradient search. Otherwise, i.e., in the case of motion activity is high and the neighbouring macroblocks can not provide good initial motion vector, the block motion estimation algorithm will perform the search using the hexagonal search combining the large hexagonal search pattern and the efficient inner search described above.

Summarizing, from the above description, one can see that the proposed efficient search schemes attempt to maximally exploit the strong correlation among the inner search points to be checked in the shrunk pattern (e.g. diamond or hexagon) and their surrounding search points checked in the large pattern. The same idea can be applied to other search patterns, e.g., square pattern. Several methods (compare references [1-5]) have been suggested and some other variants can be also designed based on the same idea. Using the distortion information in a group, such as the distortion information of a tuple comprising at least two search points, instead of using distortion information at each individual point, one can achieve more robust performance. Combining the efficient inner search with the hexagonal search method, a more powerful search algorithm is developed, which also exploits the motion information in the region of support comprising the neighbouring macroblocks. The efficient inner search method can be easily incorporated into some other fast motion estimation algorithms such as the three-step search method and its variants, four-step search method, etc.

The invention may be implemented using a special electronic circuit, i.e. in hardware, or using a computer program, i.e. in software.

The block motion estimation method is preferably used in the field of video encoding.

The following publications are cited in this document:

[1] K. Ma and P. Hosur, Performance Report of Motion Vector Field Adaptive Search Technique (MVFAST), ISO/IEC JTC1/SC29/WG11 N3325, March 2000.

[2] S. Zhu and K. Ma, "A new diamond search algorithm for fast block-matching motion estimation," IEEE Transactions on Image Processing, vol. 9, no. 2, pp. 287-290, 2000.

[3] J. Tham, S. Ranganath, M. Ranganath and A. Kassim, "A novel unrestricted centre-biased diamond search algorithm for block motion estimation", IEEE Transaction on Circuits & Systems for Video Technology, vol. 8, no. 4, pp. 369-377, 1998.

[4] R. Li, B. Zeng and M. L. Liou, "A new three step search algorithm for block motion estimation", IEEE Transactions on Circuits & Systems for Video Technology, vol. 4, pp. 438-442, 1994.

[5] L. M. Po and W. C. Ma, "A novel four-step search algorithm for fast block motion estimation", IEEE Transactions on Circuits & Systems for Video Technology, vol. 6, pp. 313-317, 1996.

LIST OF REFERENCE SIGNS 100 reference picture
101 search points
102 search area
103 central search point
104 inner search points
105 3-tuple
106 selected 3-tuple
107 closest inner search point
108 further inner search point
200 reference picture
201 search points
202 search area
203 central search point
204 inner search points
205 selected 3-tuple
206 closest inner search point
207 further inner search point
300 reference picture
301 search points
302 search area
303 central search point
304 inner search points
305 2-tuple
306 selected 2-tuple
307 closest inner search point
307a closest inner search point
308 further inner search point

What is claimed is:

1. A block motion estimation method for estimating a motion vector on the basis of a position of a frame block in a current picture compared to a position of said frame block in a reference picture by determining, at a plurality of search points of said current picture, a variation of the current picture as compared to the reference picture, said search points defining a polygonal search area along the perimeter thereof, said search area including reference search points checked and inner search points to be checked, said checked reference search points including reference search points along the perimeter of said search area and a central reference search point in said search area, the method comprising:

sub-dividing the plurality of checked reference search points along the perimeter of said search area into a sub-plurality of n-tuples, each n-tuple comprising n of said checked reference search points, wherein n is equal to three, wherein the polygon is a four-corner diamond having four faces and four corners, wherein said sub-plurality of n-tuples comprises eight 3-tuples, wherein four of said eight 3-tuples are formed by three checked reference search points located on one of said faces and four of said eight 3-tuples are formed by one checked reference search point at one of said four corners and by two of said checked reference search points located on two of said faces adjacent to said one of said four corners for each n-tuple of said sub-plurality of n-tuples, determining a distortion at each of said n checked reference search points of said each n-tuple and adding the determined distortions of said n checked reference search points so as to compute a sum of distortions of said each n-tuple, determining a selected n-tuple of said sub-plurality of n-tuples having the smallest sum of distortions among said sub-plurality of n-tuples, identifying at least one closest inner search point within said search area, said closest inner search point having a distance from said selected n-tuple which is smaller than the distances of further inner search points from said selected n-tuple, comparing the distortion at said at least one closest inner search point and said checked reference search point such as to determine that search point thereof having the smallest distortion.

2. The method according to claim 1, wherein the reference picture is a preceding or a following picture of the current picture.

3. The method according to claim 1, which comprises a three-step search method, a four-step search method, a diamond search method or a hexagonal search method.

4. The method according to claim 3, which comprises a one-pixel search method, a half-pixel search method or a quarter-pixel search method.

5. The method according to claim 1, wherein the distortion of one or two closest inner reference search points are compared with the distortion of the checked central reference search point.

* * * * *

UNITED STATES PATENT AND TRADEMARK OFFICE
CERTIFICATE OF CORRECTION

PATENT NO. : 7,457,361 B2 Page 1 of 1
APPLICATION NO. : 10/478801
DATED : November 25, 2008
INVENTOR(S) : Ce Zhu, Xiao Lin and Lap Pui Chau It is certified that error appears in the above-identified patent and that said Letters Patent is hereby corrected as shown below:

Title Page, Item (73) Assignee please correct the name from "Nanyang Technology University" to --Nanyang Technological University--.

Signed and Sealed this

Twelfth Day of January, 2010

David J. Kappos
*Director of the United States Patent and Trademark Office*